United States Patent [19]
Wheeler

[11] Patent Number: 4,635,432
[45] Date of Patent: Jan. 13, 1987

[54] METHOD FOR IMPREGNATING AND COATING WIRE ROPE

[75] Inventor: Claude R. Wheeler, St. Joseph, Mo.

[73] Assignee: Wire Rope Corporation of America, Inc., St. Joseph, Mo.

[21] Appl. No.: 721,806

[22] Filed: Apr. 10, 1985

[51] Int. Cl.$^4$ .......................... D07B 1/16; D07B 7/14
[52] U.S. Cl. ........................................ 57/221; 57/223; 57/295
[58] Field of Search ................ 57/221, 217, 223, 232, 57/241, 250, 7, 295, 297; 156/306.9, 433; 264/174, 178 F; 427/375

[56] References Cited

U.S. PATENT DOCUMENTS

| | | | |
|---|---|---|---|
| 2,904,846 | 9/1959 | Smith | 57/295 X |
| 3,131,530 | 5/1964 | Dietz | 57/221 |
| 3,800,522 | 4/1974 | Hughes et al. | 57/217 X |
| 4,344,278 | 8/1982 | Jamison et al. | 57/221 |
| 4,426,837 | 1/1984 | Meilenner et al. | 57/293 |
| 4,445,321 | 5/1984 | Hutchinson | 57/223 |

Primary Examiner—Donald Watkins
Attorney, Agent, or Firm—Parkhurst & Oliff

[57] ABSTRACT

The present invention relates to a method of continuously impregnating and encapsulating a wire rope with a liquid polymer formed from at least two reactive components which when mixed and heated together react chemically to form the polymer. In accordance with a preferred embodiment of the invention, the components are separately pumped into a mixer and then into an injection die, and a preheated wire rope is passed through the injection die. The wire rope is preheated to a temperature sufficient to initiate reaction of the components. The reaction of the components forms the liquid polymer which continuously flows into the voids or spaces of the wire rope and encapsulates the outer surface of the wire rope. The liquid polymer cures in and around the wire rope to form a unitary impregnated and encapsulated wire rope.

18 Claims, 3 Drawing Figures

METHOD FOR IMPREGNATING AND COATING WIRE ROPE

BACKGROUND OF THE INVENTION

The present invention relates to an improved method for impregnating and coating wire rope with a curable polymeric material, and the wire rope produced by the improved method. More particularly, the present invention relates to a method for continuously impregnating and encapsulating wire rope with a polymer formed from at least two reactive components which when mixed together and heated react chemically to form a curable polymeric material.

Various methods are known for impregnating wire rope with plastic material. Such impregnated wire rope reduces contact stress between the strands of the rope and improves the load bearing capacity of the strands. Encapsulating or coating the outer surface of the wire rope in a plastic jacket also serves to protect the strands from corrosive elements such as weather and dirt, as well as sealing lubricant within the plastic jacket.

Presently known methods employed for the plastic impregnation of wire rope utilize dies which extrude plastic material around the wire rope or around the strands which are then formed into wire rope. These methods are satisfactory, but entail certain disadvantages. For example, present extrusion methods may cover the exterior surface of the wire rope with plastic, but the high viscosity of the plastic may not permit its sufficient penetration into the interstitial voids or spaces between the strands. A lack of penetration of plastic material into the voids permits abrasive contact between bare strands. High viscosity plastics are also difficult to extrude, and sometimes clog the extrusion apparatus.

Drastically decreasing the viscosity of the plastic material to the extent necessary for total impregnation of plastic material in and around the strands increases the curing time of the plastic material. In addition, the use of very low viscosity plastic material increases the expense associated with the extrusion apparatus and process by requiring the apparatus to be tightly sealed to inhibit leaks of plastic material. In addition, a uniform coating of plastic is more difficult to obtain when using ultra-low viscosity plastics.

In accordance with known methods, it is most preferable to maintain the plastic material in an intermediate viscous state just prior to and during the extrusion process to ensure a uniform coating and prevent clogging of the extrusion apparatus. Maintaining the plastic material in the proper viscous state requires a large energy input and therefore constitutes a significant expense in the manufacture of impregnated wire rope using conventional methods.

In U.S. Pat. No. 4,098,861 to Bassini, a method is disclosed for coating a single wire using a low viscosity multi-component polymer system in which two or more reactive, low viscosity ingredients are blended to form a rapidly reacting mixture which cures to form a solid polymer around the wire. The use of a multi-component polymer system is sometimes referred to as reactive injection molding (RIM) technology. Such techniques have the advantage that the components are not mixed until ready for use and thus it is less expensive to maintain the components and/or the mixture in the proper viscous state.

The Bassini process or RIM technology may be satisfactory for coating a single wire having a smooth outer surface without internal spaces or voids. However, it is unsuitable for use with a wire rope or strand having a convoluted outer surface and interstitial voids. In particular, the process parameters of Bassini (e.g., temperatures of 175°–400° F.; pressures of 200–3500 psi; curing period of approximately 1 second; and coating speeds of approximately 3000 feet per minute) render it incapable of uniformly impregnating and encapsulating a wire rope or strand in a continuous economic process. In the Bassini process, the relatively quick coating speed and curing period do not allow sufficient time for the material to impregnate or flow into the voids of the wire rope. In addition, the high pressures of Bassini may result in the material flowing or leaking from the coating device.

OBJECTS AND SUMMARY OF THE PRESENT INVENTION

It is an object of the present invention to provide a method of impregnating and coating wire rope using low viscosity multi-component polymer systems in a continuous, efficient process in which the polymer flows into and around the strands of the wire rope and cures or polymerizes into a uniform unitary coating.

Another object of the present invention is to provide a method for manufacturing an impregnated and coated wire rope which is more economical than known wire rope manufacturing methods.

It is a further object of the present invention to provide an impregnated and coated wire rope manufactured by the process claimed herein.

To accomplish these and other objectives, the present invention relates to a method of continuously impregnating and encapsulating wire rope with a polymer formed from at least two reactive components which when mixed and heated together react chemically to form a low viscosity liquid intermediate polymer which continues to cure until it becomes a solid. In accordance with the inventive method, each component is separately pumped into a mixing unit, and the resulting blended mixture is pumped into an injection die. The mixture does not rapidly react to form the solid polymer since heat sufficient to initiate rapid reaction between the components has not been applied to the mixture. In a preferred embodiment, the wire rope is preheated to a temperature sufficient to initiate rapid reaction of the components. The preheated wire rope is then introduced into the injection die. As the preheated wire rope passes through the injection die in contact with the mixed components, the components are heated and rapidly react upon contact with the wire rope to form the liquid intermediate polymer. The liquid intermediate polymer continuously inpregnates the interstitial voids of the wire rope and encapsulates the wire rope as it passes through the die. The polymer starts curing from the center of the wire rope toward the outer surface. Upon exiting the die, the liquid polymer has cured in and around the wire rope to form an impregnated, encapsulated wire rope.

BRIEF DESCRIPTION OF THE DRAWINGS

The present invention will be described herein in conjunction with the appended figures in which like elements bear like reference numerals, and wherein.

DETAILED DESCRIPTION OF THE PREFERRED EMBODIMENTS

The present invention relates to a method of impregnating and encapsulating wire rope with a liquid polymer. Generally, a wire rope includes a core and strands helically formed or closed about the core. The core may be a fiber (FC), a wire rope (IWRC) or strand (WSC). A strand includes a central wire and outer wires helically formed or stranded about the central wire. The present method for impregnating and encapsulating wire rope is equally applicable to impregnating and encapsulating strands formed from wires. Accordingly, the invention will be described with reference to impregnating and encapsulating wire rope, those skilled in the art recognizing that impregnation and encapsulation of strands are within the scope of the invention. The term "wire rope" as used in the following description and claims can thus be interpreted as encompassing both strands and wire rope per se.

As used herein, the term "liquid intermediate polymer" will be used to designate a polymer formed by mixing two or more reactive components. The components are usually stored separately to ensure stability and increase their shelf life. The mixing and heating of the components initiates a chemical reaction which creates a low viscosity intermediate polymer that cures to form a solid polymer. The speed of the reaction, the viscosity of the liquid intermediate polymer and the speed of curing may be controlled by addition of inhibitors and/or catalysts, etc. However, the reaction speed, viscosity and curing time are generally dependent on the amount of heat applied to the mixture.

Preferably, the liquid polymers have two low viscosity components, although the inventive process is applicable to liquid polymers having more components. For example, a two component liquid polymer system may include a resin component B and an isocyanate component A. Nylon-based RIM has a catalyst component B and an initiator component A. Suitable materials include polyurethanes and nylons commercially available under the trademarks of Union Carbide RIM 2700 polyurethane and Monsanto NYRIM nylons. Other formulations are also commercially available.

Figure 1:
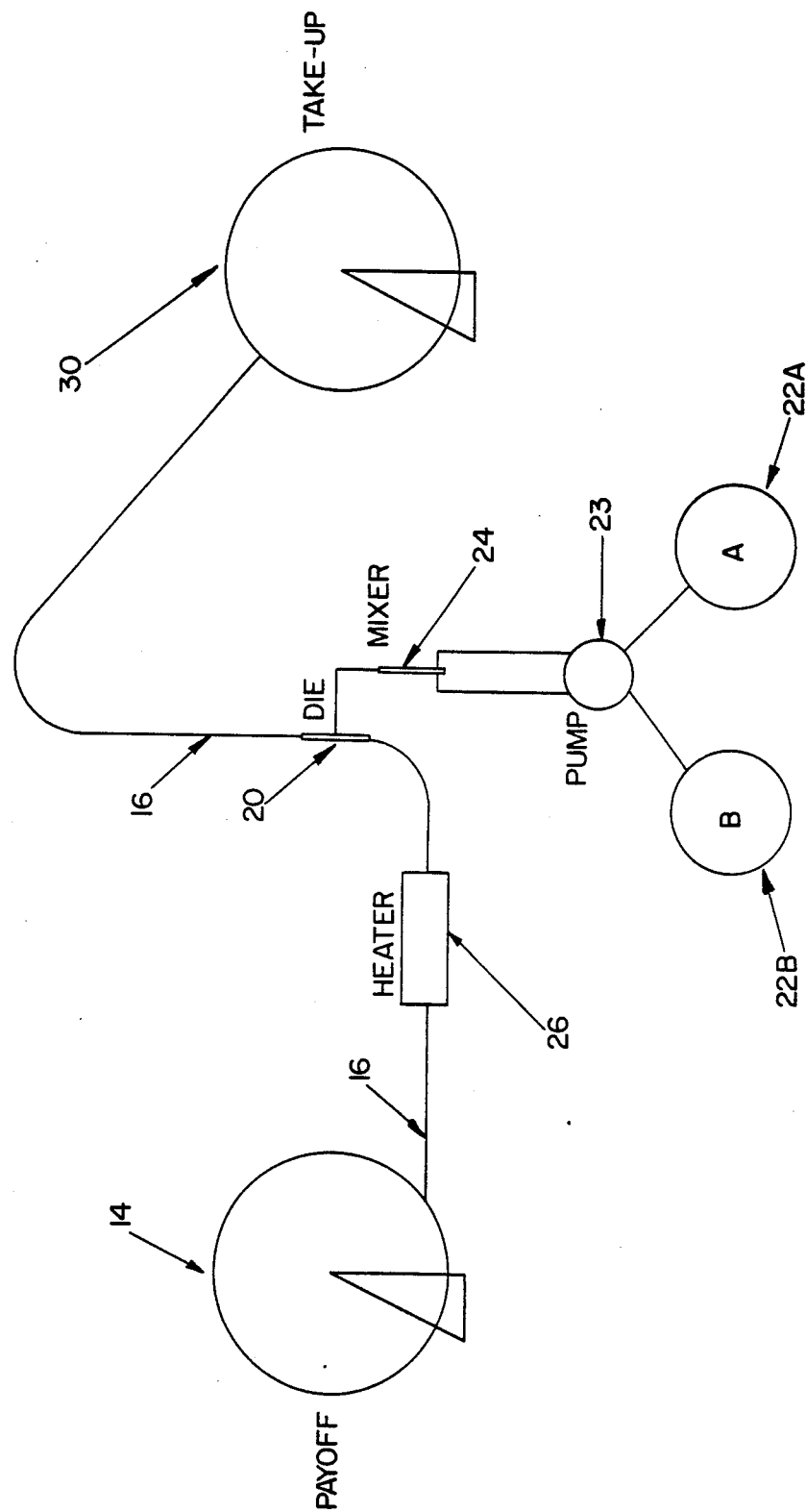
FIG. 1 is a schematic view of the process in accordance with the present invention.

The process in accordance with the present invention will be described with reference to FIG. 1 in which a wire rope 16 is located on a payoff roll 14 and is drawn through an injection die 20 for impregnation and coating. The wire rope may have been treated with a lubricant at manufacture or prior to passing through the injection die.

Prior to impregnation in the injection die 20, the components A, B are stored in separate reservoirs 22A, 22B preferably at ambient temperatures. The components A and B are separately pumped by a pump 23 into a mixing unit 24. The viscosity of the components is in the range of 500 to 5000 cP and they are conventionally pumped into the mixing unit 24 in which the components are blended together.

The components may slowly begin to react in the mixing unit, but the reaction is inhibited due to the absence of heat sufficient to sustain the reaction in the mixing unit. The blended mixture may begin to increase in temperature by virtue of heat produced during the initial reaction states but this reaction is relatively slow. Accordingly, it is preferable to pump the blended mixture immediately into the injection die 20 so that the heat produced upon the initial mixing of the components does not build up in the mixing unit 24 and accelerate the reaction towards completion. In the preferred embodiment, the components are pumped through the mixing unit 24 and into the injection die 20 within 3-5 seconds by conventional methods.

It is further noted that heat may be applied to the separate components or blended mixture to a degree sufficient to control the viscosity of the components or mixture, but insufficient to initial a rapid reaction between the components. For example, the components and/or mixture may be heated to about 135° F. to adjust the viscosity without initiating the rapid reaction of components A and B. The degree to which the components are preheated is dependent on the particular polymer and the temperature which initiates rapid reaction of that polymer. Nevertheless, it is important that the particular components or mixture employed not be preheated to a temperature that initiates a rapid reaction.

The slowly reacting blended mixture is pumped into the injection die 20 for contact with the wire rope 16 as it passes therethrough. The die 20 is preferably a vertically oriented, tubular apparatus having an inside diameter nominally equal to the outside diameter of the coated wire rope. The length of the die is a factor in maintaining the proper impregnation pressure within the die. For example, if the die is too long, the reacting components will begin to solidify within the die, thereby risking clogging. Alternatively, if the die is too short, injection pressures will vary and permit liquid polymer to leak from the bottom of the die. Preferably, the length of the tube is about 15 to 30 rope diameters, and designed to maintain an injection pressure of about 50 psi, and more preferably about 30 psi. The viscosity of the blended mixture in the die is approximately 500 cP.

The heat necessary to initiate a rapid reaction of the components is preferably supplied by preheating the wire rope 16 in a heater 26 located between the payoff roll 14 and the injection die 20. The heater 26 may be of any conventional type, for example an induction coil heater. Normally, the heater will preheat the wire rope to a temperature of approximately 170° F., which is sufficient to initiate a reaction of components A and B. The precise preferred temperature, however, is dependent on the type of components employed, since other components may require more or less heat to initiate their reaction.

Other methods or means are available for supplying the heat necessary to initiate a rapid reaction of the components in the die upon contact with the wire rope. For example, a heater may be located within the die to heat the components as they enter the die, the heat initiating the rapid reaction at the time the blended mixture contacts the wire rope. Regardless of the method or means for supplying the heat sufficient to initiate the rapid reaction of components, such method or means preferably heats the components within the die as, or shortly after, the components contact the wire rope. The preferred method, however, is to preheat the wire rope in a separate heater, thereby simplifying the heating process and reducing the complexity of the die.

The preheated wire is conveyed through the injection die at a speed of approximately 25 to 50 feet per minute (FPM), preferably 30 feet per minute, and into contact with the blended components which have been pumped into the die at a preferable pressure of 20-50 psi. Injection ports within the die direct the blended component mixture against the wire rope so that the mixture is heated by the wire rope and rapidly reacts. Once reaction temperature is reached, the liquid intermediate polymer if formed. The liquid intermediate polymer has a viscosity of approximately 300 cP and penetrates or flows into the voids of the wire rope to form a unitary mass of polymer and strands. The polymer fills the interstitial voids and forms a coating around the outer surface of the wire rope, the thickness of which is dependent on the inner diameter of the die and the outer diameter of the wire rope. Drawing the wire rope through the injection die permits the continuous application of the polymer to the wire rope. The wire rope is preferably drawn vertically upward toward a take-up roll 30 to facilitate the formation of a uniform outer coating.

The liquid intermediate polymer preferably begins to cure within the die from the center of the wire rope outward with only a thin outer coating curing outside the die. Cure times range from 7 to 30 seconds with a preferable average cure time of 15 seconds. Clogging of the die with cured polymer is inhibited by controlling the speed of the wire rope, the die pressure and viscosity of the components. In particular, if the polymer is exiting the injection die in an uncured state, the temperature of the wire rope may be increased to initiate more rapid curing. Likewise, the temperature may be held constant and the rope speed and injection rate reduced to allow the polymer more cure time inside the injection die.

An advantageous feature of the inventive process is that the polymer flowing into the voids is usually subjected to the relatively highest temperature and thus most readily cures. That is, the radially innermost polymer in the voids is subjected to the heat from the wire rope before the radially outermost polymer which does not react until the heat from the wire rope radiates outward. In addition, the polymer in the voids is usually the polymer which has been inside the die for the longest period of time. Accordingly, the polymer within the voids cures before the polymer which forms the jacket for the wire rope cures. If the jacket were to cure first, the jacket would collapse or shrink onto the wire rope, thereby stressing the polymer and strands within the jacket. The radially outward curing of the liquid polymer in accordance with the present invention assures equalization of stress within the rope by preventing shrinkage of the jacket on uncured polymer within the jacket.

The present invention is additionally illustrated in connection with the following examples which are to be considered as illustrative of the invention and not limited to specific details.

EXAMPLE 1

A satisfactory encapsulated and impregnated wire rope product was produced in accordance with the present invention using the following materials and parameters:

Components and mixing rates thereof: RIM polyurethane A and B 10 lbs/minute
Temperature of preheated wire rope: 180° F.
Die pressure: 30 PSIG
Length of die: 24 inches
Internal diameter of die tube: 1.560 inches
External diameter of die tube: 1.750 inches
Rope speed: 35 FPM
Curing time: 7 seconds
Preheating of components of mixtures: 130° F. of component B only
Viscosity of components: A=450 cP B=950 cP
Viscosity of liquid intermediate polymer: 650 cP
Time in mixer: 2 seconds The injection process ran very stable with penetration into the core of the rope. Over 50,000 feet of this diameter rope has been impregnated in repetitive runs.

EXAMPLE 2

Components and mixing rates thereof: NYRIM A and B 4 lbs/minute
Temperature of preheated wire rope: 300° F.
Die pressure: 20 PSIG
Length of die: 36 inches
Internal diameter of die: 0.780 inches
External diameter of die: 1.000 inches
Rope speed: 20 FPM
Curing time: 30 seconds
Preheating of components or mixtures: 225° F.
Viscosity of components: A and B—300 cP
Viscosity of liquid intermediate polymer: 300 cP
Time in mixer: 7 seconds The process ran stable with complete penetration. The die was lengthened from 24 to 36 inches to allow extra in die curing and to prevent leakage due to lower viscosity of the intermediate polymer.

The process in accordance with the present invention has several advantages over known wire rope impregnating and coating methods. The use of a RIM system reduces costs by eliminating the need for maintaining the polymer at a given viscosity for extended time periods as in known extrusion processes. Production costs are further reduced by using lower pressures and temperatures than known processes. The liquid intermediate polymer upon reacting has a low viscosity which permits the liquid polymer to insure penetration of generally all the interstitial voids of the wire rope and to coat uniformly the surface of the wire rope. The process parameters of the inventive process are more advantageous than to those of present extrusion processes, since heat must be added to the inventive process to initiate rapid curing and solidification of the intermediate liquid polymer, while heat must be removed from thermoplastic intermediate liquid polymer in extrusion processes for solidification to occur. The inventive method thus provides significant advantages over known extrusion processes.

Figure 2:
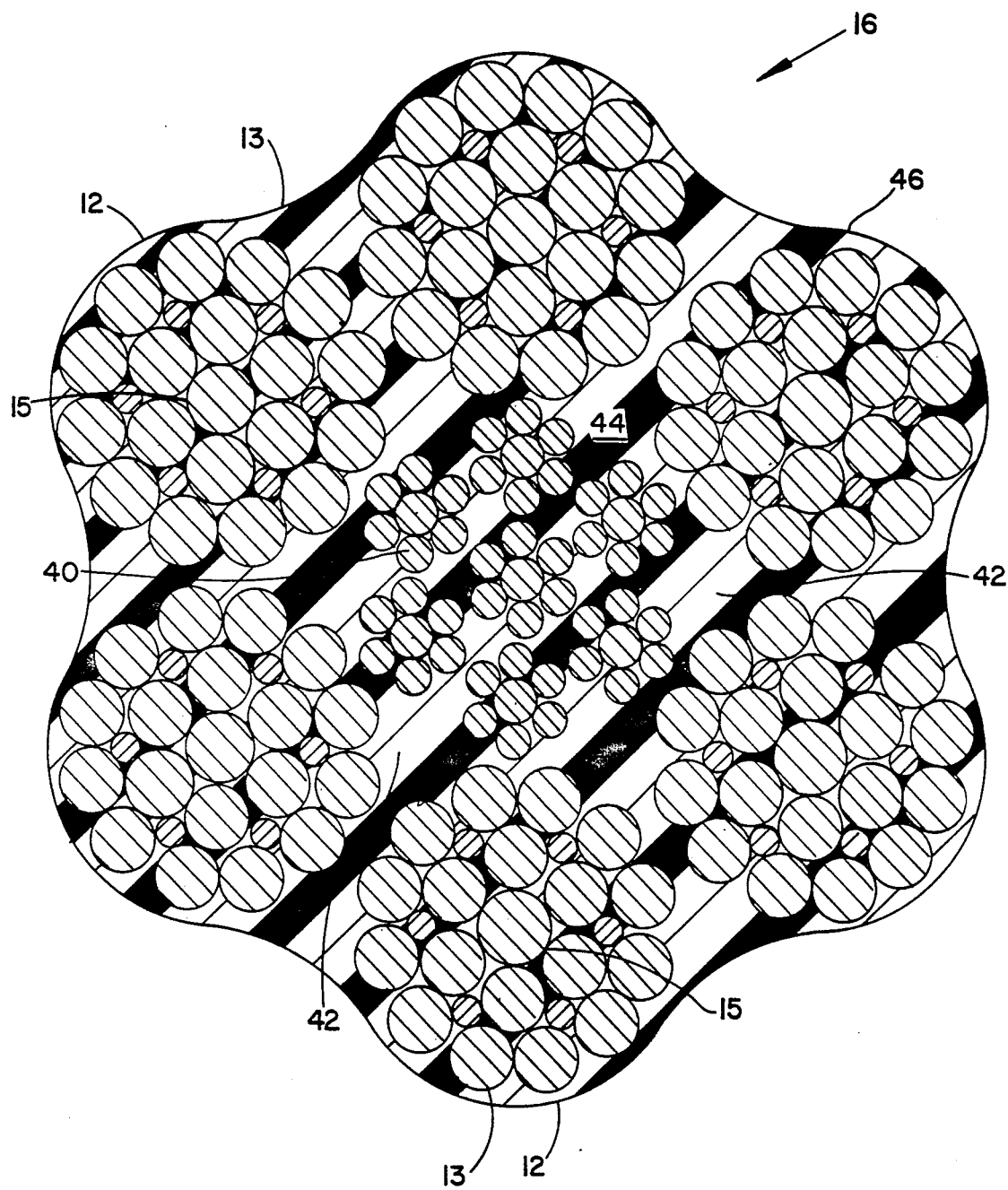
FIG. 2 is an enlarged cross-sectional view of an impregnated, encapsulated wire rope manufactured by the process illustrated in FIG. 1.

The impregnated and encapsulated wire rope product formed in accordance with the present invention is illustrated in FIG. 2. The wire rope 16 includes a central core 40 with several surrounding outer strands 12 which are helically closed about the core. Each strand 12 includes several wires 13 helically stranded about a central wire 15. After impregnation, the interstitial voids or spaces 42 between the strands are filled with the liquid polymer 44. The liquid polymer extends throughout the spaces 42 between the strands and forms a jacket 46 surrounding the outer surface of the outer wires.

Figure 3:
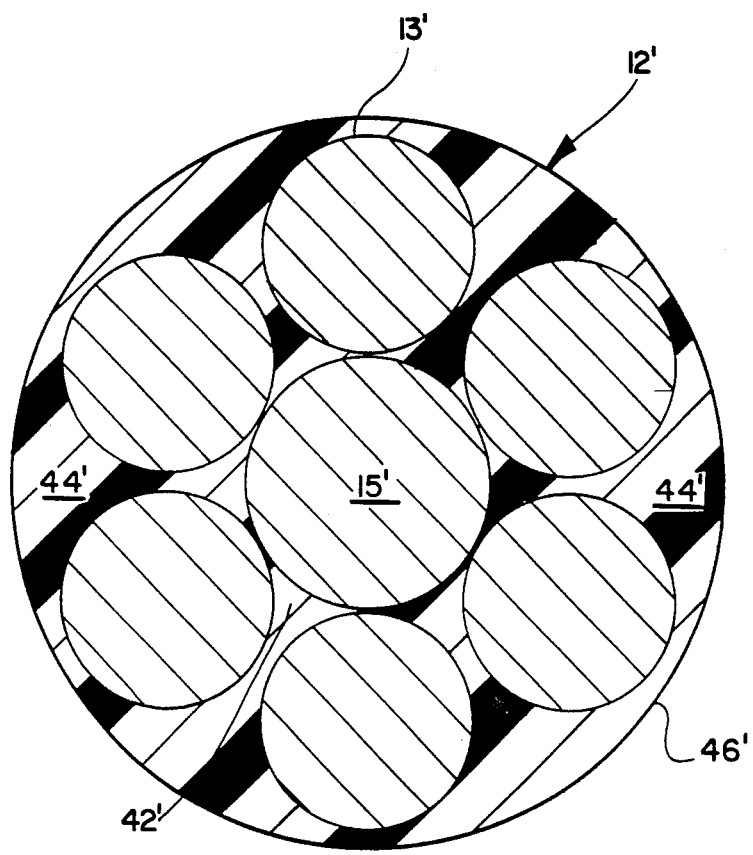
FIG. 3 is an enlarged cross-sectional view of an impregnated, encapsulated strand manufactured by the process illustrated in FIG. 1.

FIG. 3 illustrates an impregnated and encapsulated strand 12' formed from wires 13' stranded about a central wire 15'. The spaces 42' between the wires 13' of the strand 12' are filled with polymer 44'. A jacket or coating 46' surrounds the strand 12'. A plurality of impregnated and encapsulated strands 12' may be closed into a wire rope, the resulting wire rope being impregnated and encapsulated in accordance with the present method.

The use of the impregnated and encapsulated wire rope (FIG. 2) and/or strand (FIG. 3) manufactured in accordance with the present invention provides several advantages. Since the polymer within the interstitial voids of the wire rope or strand cures before the radially outward polymer, the wire rope and strands are better able to equalize stresses within the wire rope or strand. In addition, wire rope and strand manufactured by the present method is manufactured more economically and uniformly than wire rope or strand manufactured by known methods.

In addition, the use of the impregnated wire rope or strand in accordance with the invention prevents the intrusion of dirt and moisture into the spaces between the strands. Further, the jacket surrounding the wire rope seals lubricant within the wire rope. The plastic mass within the wire rope improves the load bearing capacity of the wire rope as well as preventing abrasive contact between the individual strands.

The principles, preferred embodiments, and modes of operation of the present invention have been described in the foregoing specification. The invention which is intended to be protected herein should not, however, be construed as limited to the particular forms disclosed, as these are to be regarded as illustrative rather than restrictives. Variations and changes may be made by those skilled in the art without departing from the spirit of the present invention. Accordingly, the foregoing detailed description should be considered exemplary in nature and not as limiting to the scope and spirit of the invention as set forth in the appended claims.

What is claimed is:

1. A method for impregnating wire rope wherein the wire rope is drawn through a die for impregnating spaces within the wire rope and coating an outer surface of the wire rope, said method comprising the steps of:
   introducing into a die a mixture of at least two reactive components, which when mixed together and sufficiently heated react rapidly and chemically to form a curable liquid polymeric material, the mixture being introduced into the die at a pressure of approximately 20–50 psi and temperature at which rapid reaction between the components does not occur;
   passing the wire rope through the die to contact the component mixture;
   applying heat to the component mixture in the die while simultaneously contacting the component mixture with the wire rope, the applied heat being sufficient to initiate a rapid reaction of the components upon contacting the wire rope to cause the components to form the liquid polymeric material and impregnate and encapsulate the wire rope; and
   curing the polymeric material to form an impregnated, coated wire rope.

2. The method of claim 1, wherein said heat is applied to the component mixture in the die by preheating the wire rope before introducing the preheated wire rope into the die to contact the component mixture.

3. The method of claim 2, wherein the wire rope is preheated to a temperature of approximately 150°–170° F.

4. The method of claim 1, wherein the wire rope is passed through the die at a speed of approximately 25–50 feet per minute.

5. The method of claim 1, wherein the liquid polymeric material cures within a period of 12 to 18 seconds.

6. The method of claim 1, wherein the radially innermost liquid polymer within the spaces of the wire rope cures before the radially outermost liquid polymer adjacent the outer surface of the wire rope cures.

7. The method of claim 1, further comprising the step of preheating the components to a temperature which is sufficient to adjust the viscosity of the components without initiating a rapid reaction between the components before introducing the component mixture into the die.

8. The method of claim 7, wherein the components are preheated to a temperature of approximately 135° F.

9. The method of claim 1, further comprising the step of preheating the component mixture to a temperature which is sufficient to adjust the viscosity of the component mixture without initiating a reaction between the components before introducing the component mixture into the die.

10. The method of claim 1, further comprising the step of treating the wire rope with a lubricant prior to passing the wire rope through the die.

11. The method of claim 1, wherein the wire rope is passed generally vertically upward into a die having a generally vertical major axis.

12. The method of claim 1, wherein the die has a bore therein through which the wire rope is passed, the inner diameter of the bore being nominally equal to the outer diameter of the wire rope.

13. An impregnated and coated wire rope formed by the method of claim 1.

14. A method for continuously impregnating and encapsulating a wire rope with a polymeric material formed from at least two reactive components which when mixed together and sufficiently heated react rapidly and chemically to form a curable liquid polymeric material, said method comprising the steps of:
   separately introducing each component into a mixing unit, and transferring the component mixture into an injection die at a pressure of 20–50 psi and a temperature at which a rapid reaction of the components of the component mixture does not occur;
   preheating the wire rope to a temperature sufficient to initiate reaction of the components;
   introducing the preheated wire rope into the injection die in contact with the component mixture, the component mixture being heated upon contacting the wire rope and rapidly reacting to form a liquid polymer; and
   continuously impregnating spaces within the wire rope and encapsulating the outer surface of the wire rope with the liquid polymer as the wire rope passes through the injection die, the liquid polymer thereafter curing to form an impregnated, encapsulated wire rope.

15. An impregnated, encapsulated wire rope comprising:
   a core;
   a plurality of strands laid around said core to form a wire rope having an outer surface and spaces between the core and strands and between adjacent strands; and a cured polymeric material filling the spaces and coating the outer surface of the wire rope, the cured polymeric material being formed by the reaction of at least two components which when mixed together and sufficiently heated react chemically and rapidly to form a curable liquid polymeric material that penetrates the spaces and cures in a radially outward direction such that the liquid polymer in the spaces cures before the liquid polymer adjacent the outer surface of the wire rope, the liquid polymeric material providing a cushion around the core and strands to equalize stress within the wire rope and support the strands in positions established during stranding and rope closing.

16. The wire rope of claim 15 wherein the polymeric material includes a resin component and an isocyanate component.

17. The wire rope of claim 15 wherein the polymeric material is a nylon-based material that includes a catalyst component and an initiator component.

18. The wire rope of claim 15 wherein the curable liquid polymer forms upon contact with a sufficiently heated wire rope.

* * * * *